United States Patent [19]

Addison et al.

[11] Patent Number: 5,073,224

[45] Date of Patent: Dec. 17, 1991

[54] APPARATUS FOR INJECTING A CHEMICAL BARRIER INTO A SURFACE APERTURE

[75] Inventors: Mark K. Addison; William F. Campbell, both of Fort Worth; Ralph J. Panno, Grapevine, all of Tex.

[73] Assignee: General Dynamics Corporation, Fort Worth, Tex.

[21] Appl. No.: 427,607

[22] Filed: Oct. 26, 1989

[51] Int. Cl.[5] ............................................. B32B 31/00
[52] U.S. Cl. ...................................... 156/382; 156/94; 156/578; 264/36; 264/102; 425/13
[58] Field of Search ..................... 156/94, 382, 578; 264/36, 37, 102, 511; 425/11, 12, 13, DIG. 60

[56] References Cited

U.S. PATENT DOCUMENTS

| | | | |
|---|---|---|---|
| 1,953,452 | 4/1934 | Wertz | 427/140 |
| 4,144,625 | 3/1979 | Hogenhout | 427/285 |
| 4,280,861 | 7/1981 | Schwartz | 156/94 |
| 4,429,658 | 2/1984 | Jones | 118/711 |
| 4,582,551 | 4/1986 | Parkes et al. | 156/94 |
| 4,627,952 | 12/1986 | Ophir | 264/37 |
| 4,635,827 | 1/1987 | Roedig | 118/410 |
| 4,775,305 | 10/1988 | Alexander et al. | 425/12 |

*Primary Examiner*—Timothy Heitbrink
*Attorney, Agent, or Firm*—James C. Fails; Geoffrey A. Mantooth

[57] ABSTRACT

A barrier injection apparatus for injecting a barrier at a site characterized by a holder for holding the apparatus in place against the force of injection; at least one injector for injecting a medium for a barrier at the injections site when in place; respective conduit system extending from the storage unit, and including a pump for inducing pressure onto the medium, to the injection site for injecting the medium at the injection site under pressure; storage unit for storing the medium at atmospheric pressure and being connected with a suction side of a pump that will introduce pressure; a second conduit connected with the barrier injection apparatus and adapted to remove unused medium from the site, an adjusting mechanism for adjusting the injectors to a correct distance; and a gasket sealingly surrounding the injection site for constraining the medium to flow into the site under pressure and insulate the medium from a holding mechanism. Also disclosed are specific preferred embodiments.

21 Claims, 9 Drawing Sheets

APPARATUS FOR INJECTING A CHEMICAL BARRIER INTO A SURFACE APERTURE

FIELD OF INVENTION

This invention relates to forming a chemical barrier between parts of an assembled structure and their adjoining fasteners by injecting an appropriate substance around the installed fasteners. More particularly, this application and invention relates to injection of corrosion inhibitors, leak prevention materials and the like for repair or corrosion prevention.

DESCRIPTION OF THE PRIOR ART

Art in this area is generally difficult to find. The closest prior art of which the inventors are aware is an apparatus illustrated in FIG. 1 and described later hereinafter. A pre-examination search turned up the following U.S. Pat. Nos.:

4,635,827 describes an applicator for applying a sealant about a rivet machine also in which the machine applies sealant between the drilling hole and the setting rivet.

4,582,551 describes an invention rating to sealing of joints, leaks and pipelines and mains by an expandable tubular pig which is moved endwise through the pipeline. The sealant is in the form of anaerobically curable monomer which cures in the relatively air free conditions in the joint or leak in the pipeline. The pig forms within the pipeline an air free space which communicates with the joint or leak and which is isolated from the fluid in the main flow. The pig is hollow to permit the flow of fluid therethrough while the joint or leak is sealed. The sealant is injected into the leakage by way of space so that the sealant cures in situ to stop the leak.

4,429,658 describes an applicator for applying a sealant about rivets or the like.

4,144,625 describes an applicator apparatus for automatic riveting machines and the like in which a sealant is applied about the rivets.

1,953,452 describes process for repairing masonry structures in which a sealant material is injected into cracks or crevices in the masonry.

As can be seen the invention is not anticipated or made obvious by the prior art.

As can be seen it is desirable that the apparatus provide one or more of the following features delineated useful and not heretofore provided.

1. Injector should be useful in any type of location where either vacuum or mechanical hold device can hold it.
2. The injector must be able to use a pulse type injector system.
3. The injection system should be portable and highly automated such that it requires little time to set up and inject at a given location.
4. The effectiveness of the system should not depend upon the operator's strength or patience.

SUMMARY OF THE INVENTION

Accordingly it is an object of this invention to provide one of the foregoing features delineated as desirable and not heretofore provided.

It is an object of this invention to provide substantially all of the features delineated as desirable hereinbefore and not heretofore provided.

These and other objects will become apparent from the descriptive matter hereinafter, particularly when taken in conjunction with the appended drawings.

In accordance with one embodiment of this invention, there is provided a barrier injection apparatus for injecting a barrier at a site, being characterized by adjustable and releasable holding means for holding the injection apparatus against the force of injection; an injection apparatus, per se, for injecting a medium to form a barrier when in place; a storage tank for holding the medium at atmospheric pressure; pressure inducing pump or means connected with the storage tank for inducing pressure on the medium; conduit means connectedly extending from the storage tank and including the pump for conveying pressurized medium, to the injection site; a second conduit means connected with atmospheric pressure and adapted to remove unused medium from the injection site; adjusting means for moving the injector the correct distance from the injection site; and gasket sealingly surrounding the injection site for constraining the medium to flow into the injection site and insulating the medium from the holder. Also disclosed are preferred embodiments employing vacuum holders, pulse and static pressures, vessels for catching the medium drain from the injection site and the preferred form of the gasket.

In this way the injector can be employed readily even on aircraft or the like for injecting a barrier.

BRIEF DESCRIPTION OF THE DRAWINGS

FIG. 4 is a schematic view of a hydraulic circuit for a pulse type injector system such as illustrated in FIG. 2a.

DESCRIPTION OF PREFERRED EMBODIMENT(S)

It is to be borne in mind that this invention may be useful in a wide variety of types of barrier injection situations. It has been found, however, that this is particularly useful injecting a corrosion inhibitor around a fitting such as rivet or the like in an aircraft or Navel application. It is in the application of aircrafts that this embodiment of the invention will be described hereinafter.

Figure 1:
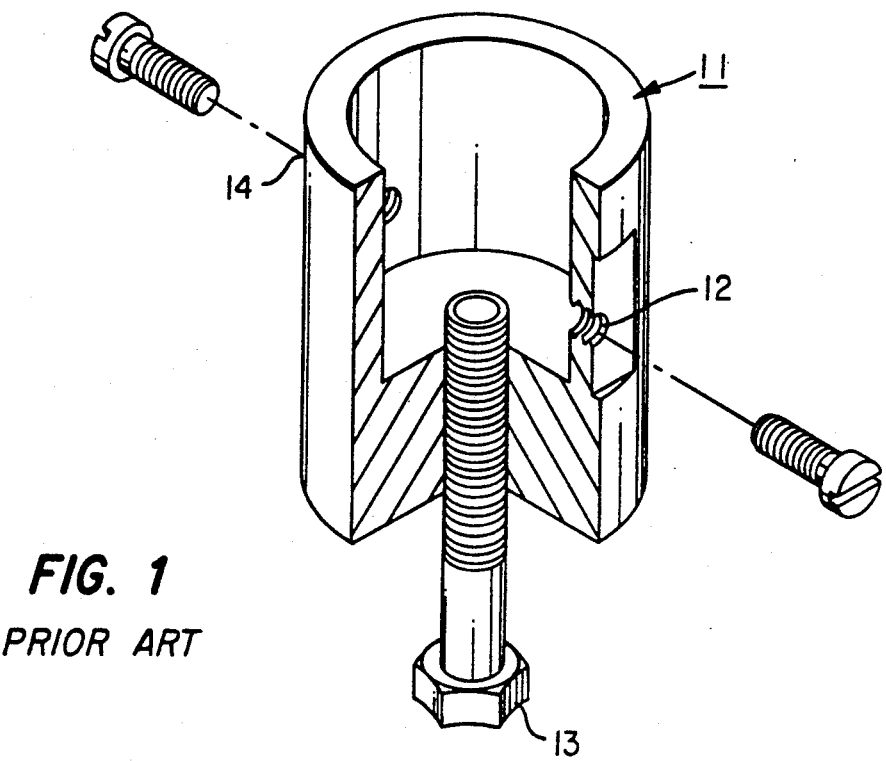
FIG. 1 is an isometric view, partly in section, illustrating a fuel leak repair injection device of the prior art.

The nearest approach to employing a method of this invention is a device used by General Dynamics to repair fuel leaks on the F-111 aircraft. FIG. 1 is an isometric view of this apparatus and is labeled prior art. The device was secured to the surface of the aircraft over a leaking fastener using an adhesive bond applied to the bonding surface 11. This surface was then bonded to the wing surface of the aircraft or the like. Thereafter the device had a fuel sealant injected through injection port 12. A large bolt 13 was turned to apply pressure to the sealant forcing the sealant around the fastener over which the apparatus was adhered. The bleed port 14 is used to release trapped air from the device.

This device required extensive cleaning of the surface both before and after bonding and a significant amount of time to cure the adhesive. The amount of sealant injected into the hole around the fastener was directly proportional to the amount of pressure applied to the bolt 13. Therefore this device was limited by the mechanical force the user was able to apply physically as well as to the patience of the user. The advantages of the injector of this invention can be seen by the following.

The injector of this invention uses a system of pumps and valves to pressurize and deliver the injection medium to the desired location. Two types of injection systems have been developed and employed; the pulse type and the static pressure type. A pulse type injector system is held in place using a vacuum cup or mechanical type hold-down system. The static type injector is held by a mechanical system for pressures above the hold-down capacity of the vacuum system. The injection system is portable and highly automated, requiring little time to set up and inject a given location. The effectiveness of the system is not dependent on the operator's strength or patience. Specifically, this invention enables providing a retrofit method of forming a chemical barrier between a structure and its adjoining fasteners that does not require disassembly of the structure and is suitable for a large number of affected areas. The intent of injecting this barrier is to prevent corrosion of a structure and its fasteners and/or prevent a fuel leak from developing around the fasteners.

Figure 2A:
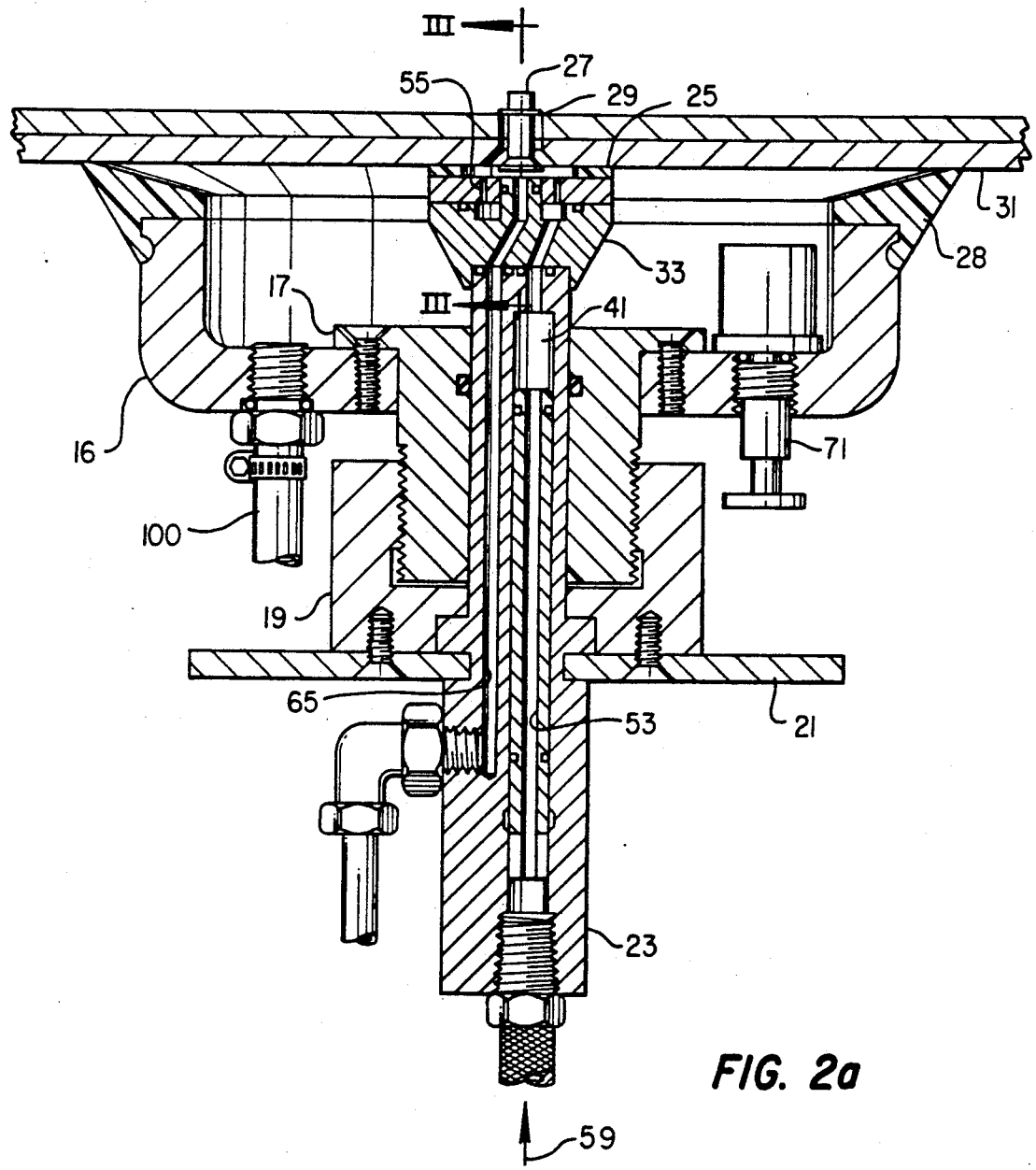
FIG. 2a is a cross-sectional view of a pulse type injector system with a vacuum cup hold down.

FIG. 2a shows a cross-sectional view of a pulse type injector system as it would be used to inject a typical corroded counter sunk fastener in the lower wing skin of an airplane. A circular vacuum cup 16 is fastened to a threaded sleeve 17. An adjusting collar 19 with a bar type adjusting handle 21 threads onto the sleeve 17. The adjusting collar and handle, 19, 21, turn independently of an injector body 23. Consequently, when the adjusting handle 21 is turned, the collar and handle 19, 21 bear on the injector body 23 moving the injector up or down without rotating it. The injector body 23 must not rotate in order to prevent an injector fitting gasket 25 from twisting and disturbing the seal. The injector fitting gasket extends about the injection site to force the medium that is injected about the fitting, such as the rivet, and into the fitting hole at the injection site.

Figure 3:
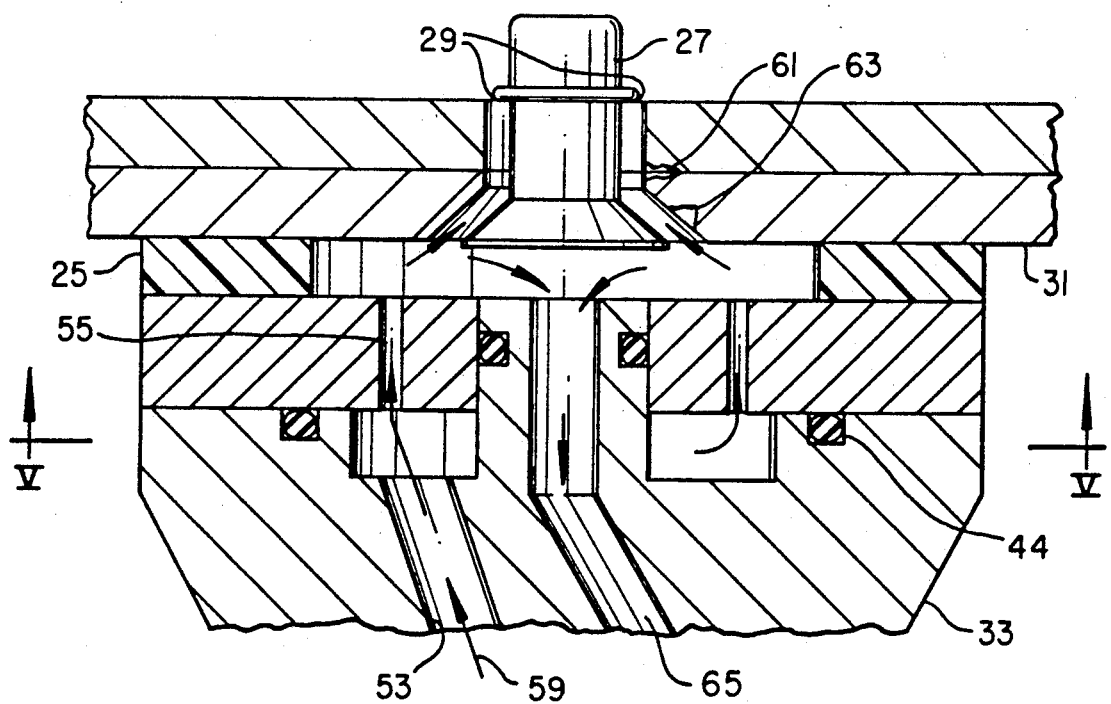
FIG. 3 is an enlarged partial cross-sectional view of the injector fitting of FIG. 2a along the dashed lines III—III.

FIG. 3 shows an enlarged detail of an injector fitting 33 located around one end of rivet 27, with the gasket 25 being a circular gasket that is disposed thereabout so as to sealingly fit and force the medium into the gap 29, shown somewhat enlarged. Referring to FIGS. 2a, 2b, 3 and 5, the injector fitting 33 is coupled to one end of the injector body 23. The injector fitting 33 has an injection passage 53 and a drain passage 65. The injection passage 53 extends through the injector fitting 33 and through the injector body 23. At the gasket end of the fitting 33, the injection passage communicates with an annular channel. The fitting 33 has a central cylindrical portion that projects outwardly. The drain passage 65 extends through the cylindrical portion, through the remainder of the fitting 33 and through the injector body 23. A disk member 81a is coupled to the fitting 33 with fasteners 108. The disk member 81a has a central circular opening for receiving the cylindrical portion and the associated drain passage 65. The disk member 81a has plural injector orifices 55 therethrough. The orifices 55 surround the drain passage 65 and communicate with the injection passage 53. O-rings 44 and 110 are provided. The injector fitting gasket 25 is very important to the operation of the injection system. For example, it keeps the injection medium over the fastener, or rivet 27, and prevents the medium from flowing into the vacuum cup. The medium may be, for example, a corrosion inhibitor as will be discussed in more detail hereinafter. The gasket 25 is made from a polysulfide (a tough elastomer); or a tough synthetic rubber such as those rubber products sold under the trademarks Neoprene or Viton, all of which are very durable when in contact with most of the investigated injected media.

The surfaces of the fastener 27 and/or parts to be injected are first cleaned of paint, primer and surface corrosion. The injector fitting 33, is centered over the fastener 27 but away from the surface approximately 0.25 inch with the vacuum cup gasket 25 in firm contact with the surface 31.

Figure 4:
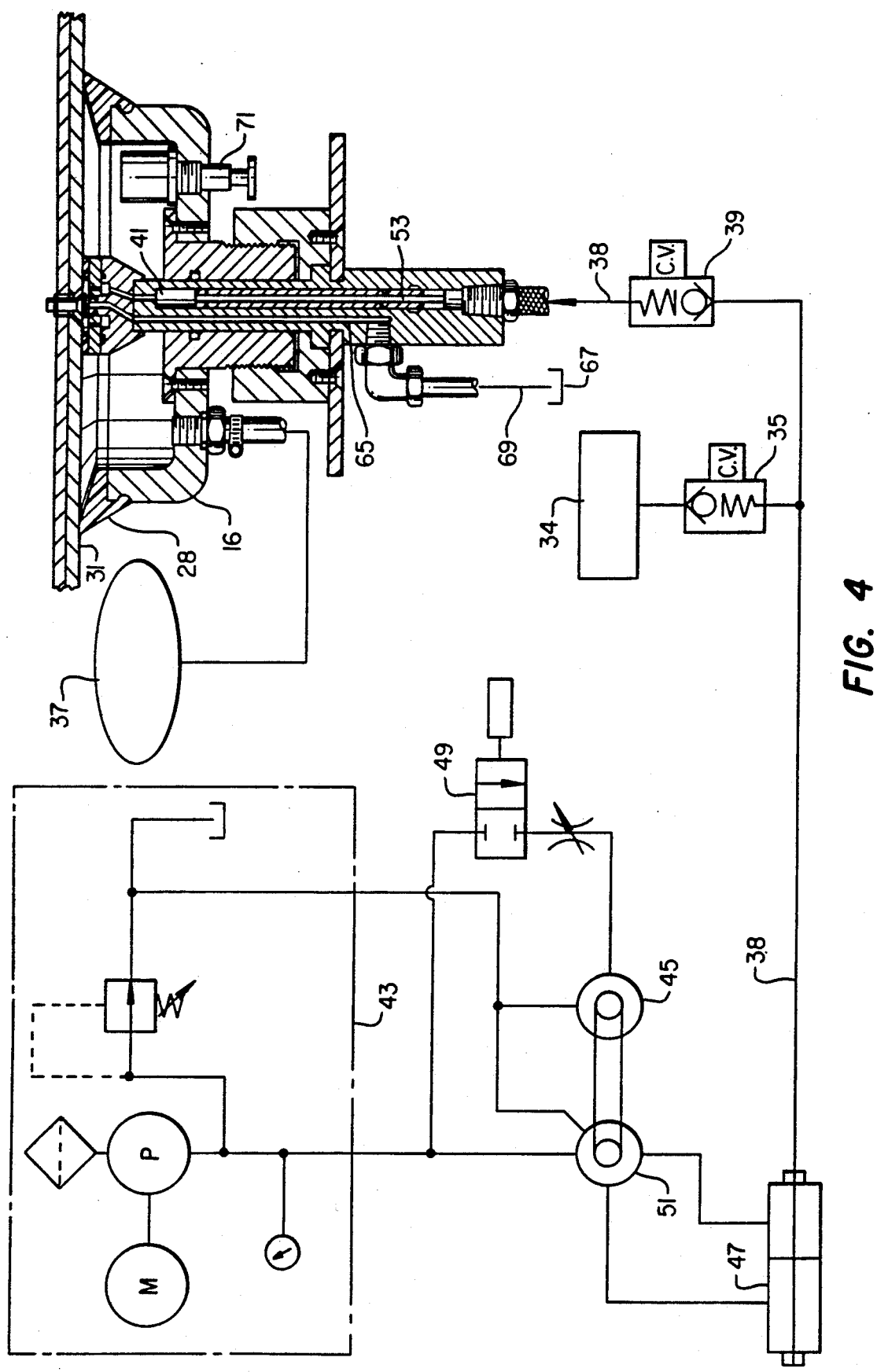
Figure 5:
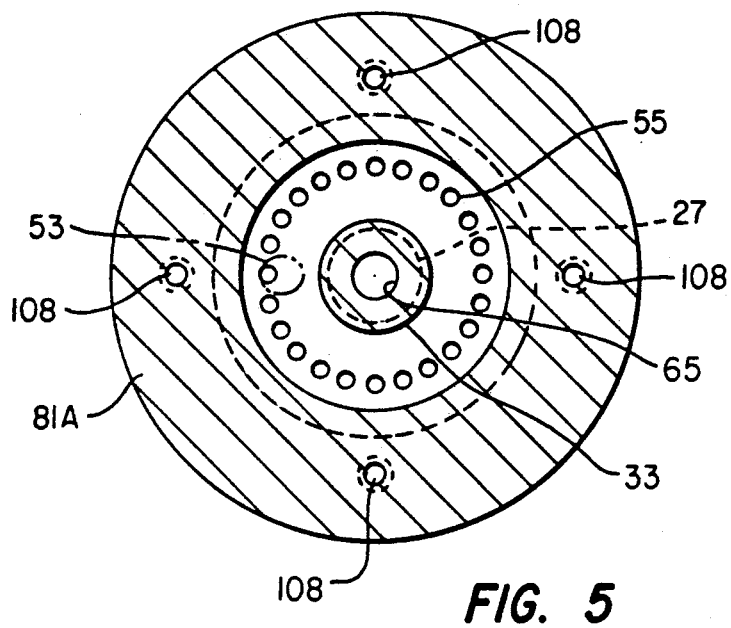
FIG. 5 is a partial cross-sectional view taken along the lines V—V of FIG. 3.

FIG. 4 illustrates the hydraulic circuit for a pulse type injector, although the illustration is schematic. Referring to FIG. 4, when the vacuum pump 37 is turned on, the vacuum cup 16 is evacuated causing a suction force to secure the apparatus to the surface 31, FIGS. 2a and 4. Simultaneously, the area about the fastener 27, including the gap 29, is evacuated to create a less resistant path for flow of the injection medium.

The adjusting means in the form of the adjusting handle 21 and adjusting collar 19 enable positioning the injector over the fastener 27 so that the injector fitting 33 is snug against the structure.

The injector fitting gasket 25 must compress enough to form a good seal but the injector must not be forced against surface 31 with excessive pressure so as to disturb the vacuum cup seal.

When the injector apparatus is turned off or is between pulses, a number one (#1) check valve 35 is opened, allowing the medium from storage tank 34 to fill the feed line 38. A number two check valve 39 is closed during this interval preventing the medium from draining out of the feed line 38. A number three check valve 41, FIGS. 2 and 4 is closed preventing the medium from being drawn out of the feed line 38 by suction.

A pump system 43 operates a hydraulic motor 45 and also supplies hydraulic fluid to a double rod intensifier 47. The hydraulic motor is started by opening a control valve 49, allowing hydraulic fluid to pass through to the motor. The hydraulic motor 45 operates a servo valve 51 which sends a pulse of hydraulic fluid to the intensifier 47 at a predetermined rate; for example, about 10 pulses per second for this application. The hydraulic pump 43 powered by the motor 45 operates at low pressure; for example, in the range of 200-400 pounds per square inch (psi). The intensifier 47 increases the pressure of hydraulic fluid to injection pressure; for example, about 2000 psi for this configuration; and sends the pressure pulse through the feed line 38. The increased pressure in the feed line 38 closes the number one check valve 35, isolating the storage tank 34 from the feed line 38. This also opens a number two and number three check valves, 41, 39, allowing the medium to flow through the feed line 38 to the injection passage 53. Since the injection passage 53 is connected with injection orifices 55, this allows the injection medium to flow out the injection orifices 55, FIGS. 2a, 3 and 5.

Figure 2B:
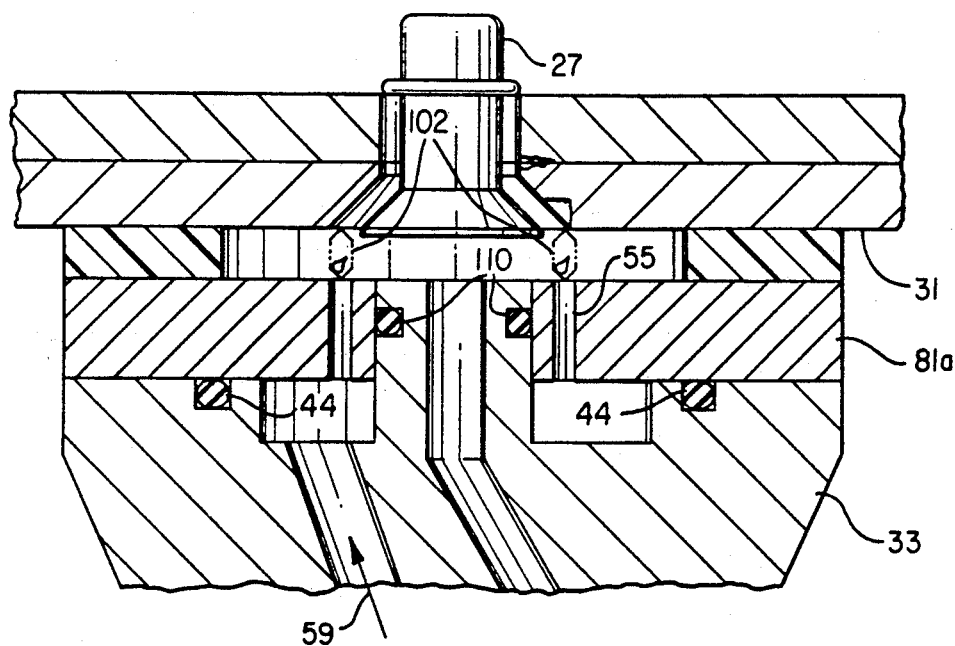
FIG. 2b is an enlarged partial cross-sectional view of the injector fitting of FIG. 2 along the dashed lines III—III.

The injection medium 59, FIG. 3 is forced through injection orifices 55, which circumferentially surrounds the head of fastener and bombards existing gap, void or corrosion pit in the structure: for example, into the gap 29, FIG. 3 intermediate the structure and the fastener 27 or into a void 61, intermediate layers of the structure, or a corrosion pitting 63; by shockwave action created by the pressure pulses traveling through the medium. The reason for the high pulse rates is that when the stream of medium fluid 102, as shown in FIG. 2b contacts the surface of the structure 31, the tail of the stream 102 has already left the injector orifices 55 preventing any reaction from the surface back to the injector through the fluid stream, thereby reducing the back pressure on the vacuum cup 16. The excess fluid 69 exits the drain passage 65, FIGS. 2a, 3 and 4, into a container 67.

Figure 11:
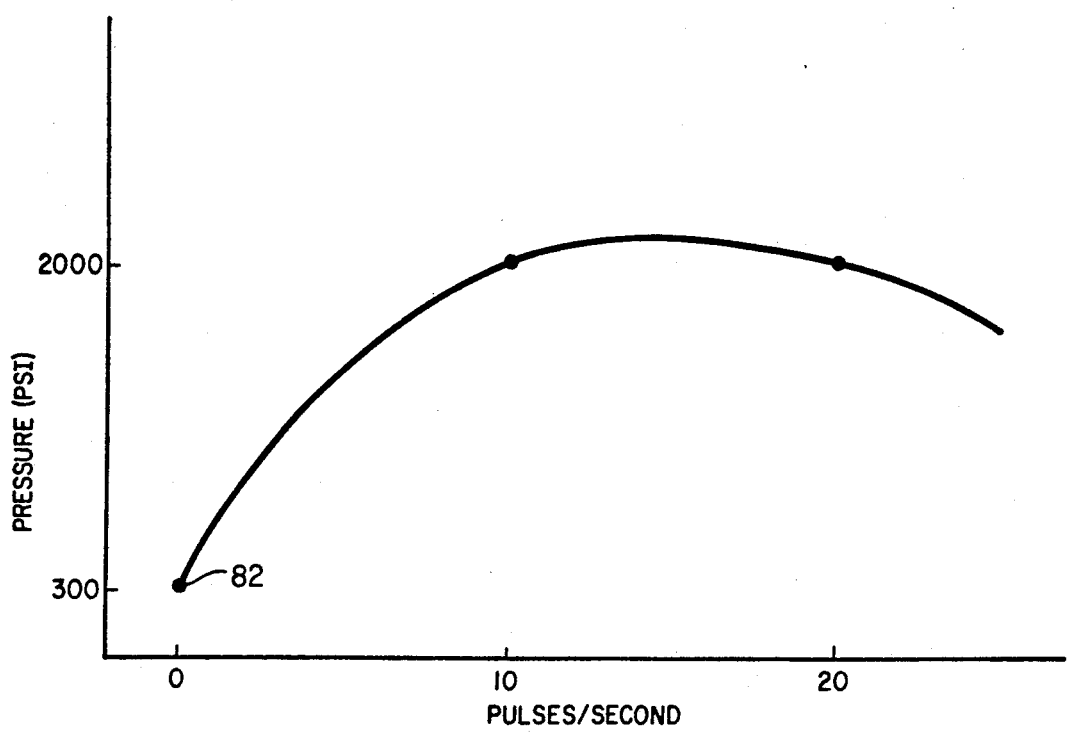
FIG. 11 is a graph showing the relative operating range of the pulse type injection system compared to a static system.

The relative operating range of the pulse type system compared to the static system is shown in FIG. 11. When the pulse rate is zero (data point 82) or near zero, the injection stream is steady state or static as mentioned herein. The maximum injection pressure at this pulse rate is approximately 300 psi for use with the vacuum holddown which corresponds to the operating condition of the static pressure type injector in FIG. 11. This pulsed system can operate up to 2000 psi using only a vacuum holddown while the static pressure system must use a mechanical holddown above 300 psi. The use of the pulse type injector allows a variation of the pulse rate in a corresponding wider range of usable pressures. As the pulse rate is increased the optimal injection pressure is also increased as shown in FIG. 11 until eventually the pulse rate reaches practical limits and the injection medium is just pumped out of the drain line and no further benefit is achieved by using higher pressure.

The best injection results are obtained at an operating condition between 10 and 20 pulses per second at 2000 psi for the pulse type injector system. However lower pulse rates and pressures as low as 600 psi are adequate for many applications. The pulse rates and pressures shown in FIG. 11 apply only to the particular configuration of the injector that was tested and any changes to the system hardware or injection medium viscosity may change the optimal pulse rate/pressure combination.

The drain passage and conduit 69, FIG. 4, serve as a second conduit means for draining off the medium that is not used in the injection. The draining of the medium further reduces the build up of back pressure which would destroy the integrity of the injector fitting seal 25 or even dislodge the injector system from the surface of the structure 31.

After the injection is complete, the control valve 49 is off, deactivating the pulse system. The number two and number three check valves 39 and 41 close and the number one check valve opens, refilling the feed line 38 for another injection. The vacuum release valve 71, FIG. 2a can be opened, equalizing the pressure between the vacuum cup 16 and the outside air and allowing the injection system to be moved to another location.

The respective elements delineated herein are commercially available and can be purchased to do the job set forth herein. Accordingly, no great amount of time will be spent describing elements such as the double rod intensifier, pump, servo valve or the like, since they are readily available. It is sufficient to note that they elevate pressure up to as high as 2000 psi as many repetition rates as desired; for example, 10 per second.

Figure 6:
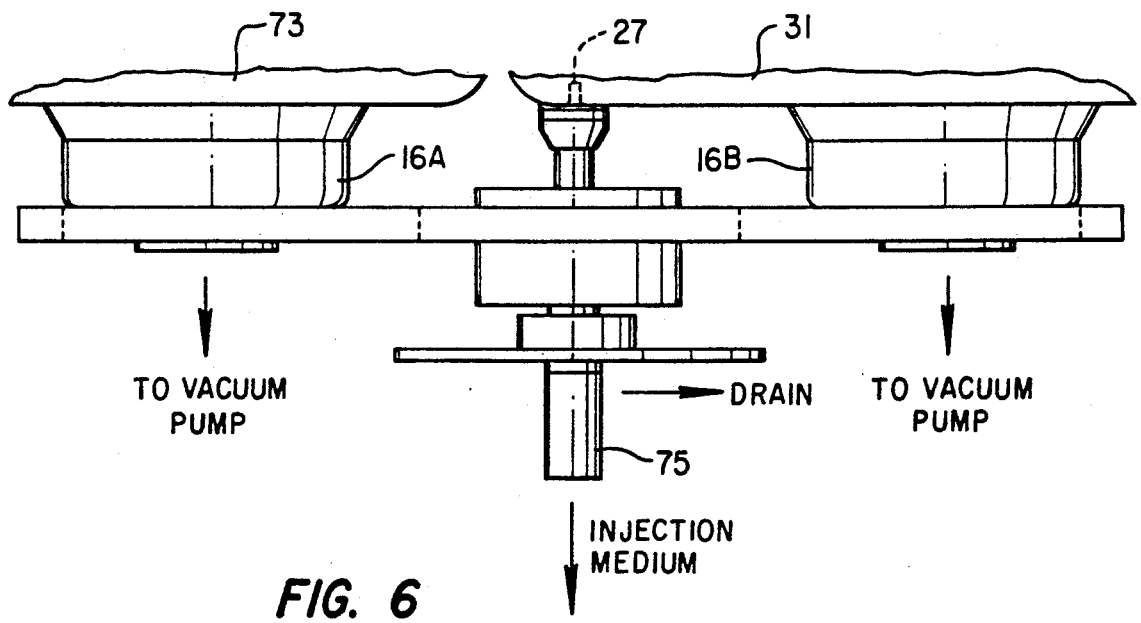
FIG. 6 is a schematic view showing a pulse type injector with a double vacuum cup hold down system, or holding means.

For locations that are not feasible for single vacuum cup holding means, alternate methods of securing the injector to the desired surface have been devised. For example, FIG. 6 illustrates the use of a double vacuum cup hold down system. This system is used for the areas close to the edge or discontinuity in the structure, in this case a corroded fastener 27 close to a gap between a wing surface 31 and a control surface 73. The vacuum cups 16A and 16B are placed equidistant from an injector 75 and one on each surface as shown. The injector 75 is placed directly over the fastener 27 to be injected and the injection is performed as described hereinbefore.

Figure 7:
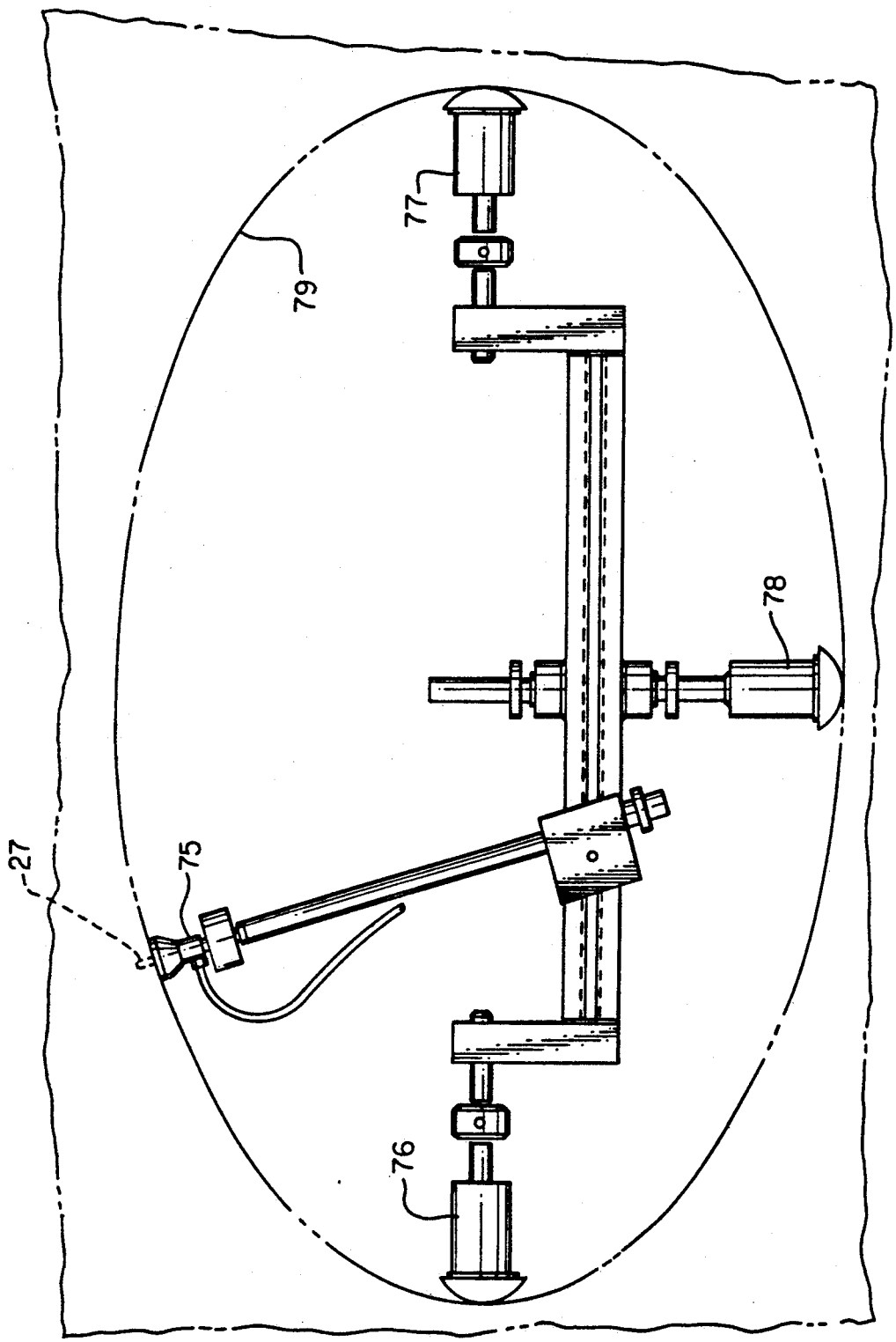
FIG. 7 is an elevational view illustrating a mechanical hold down system, or holding means.
Figure 8:
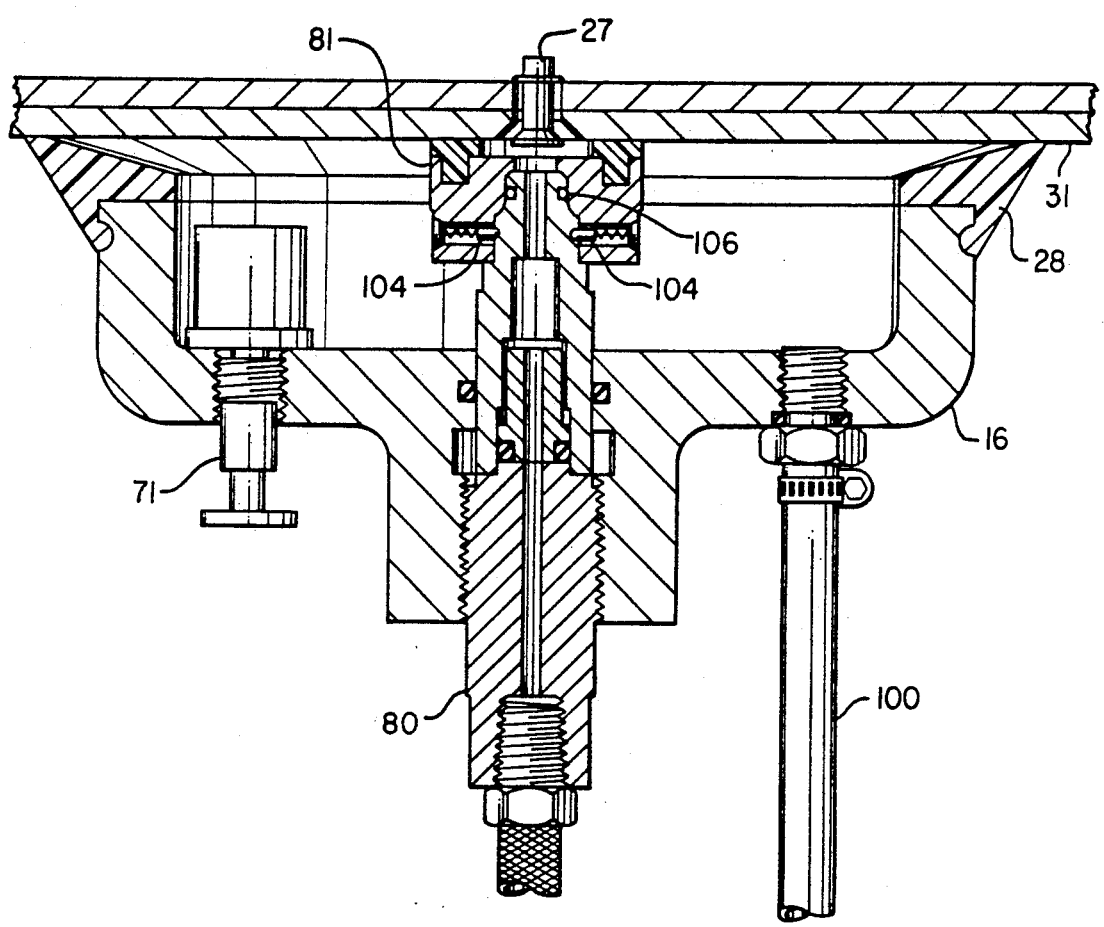
FIG. 8 is a partial cross-sectional view illustrating an injection system employing a quick disconnect injector head and configured for static pressure injection.
Figure 9:
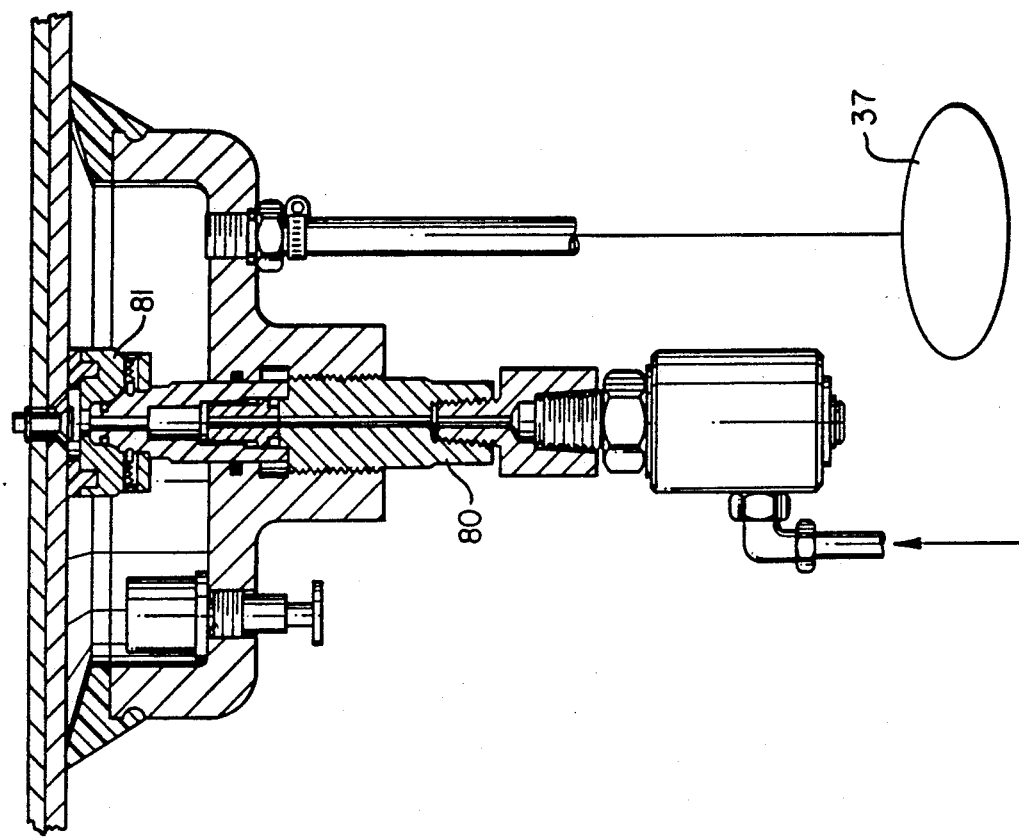
FIG. 9 is a schematic view of a hydraulic circuit for a static pressure injection system.
Figure 9:
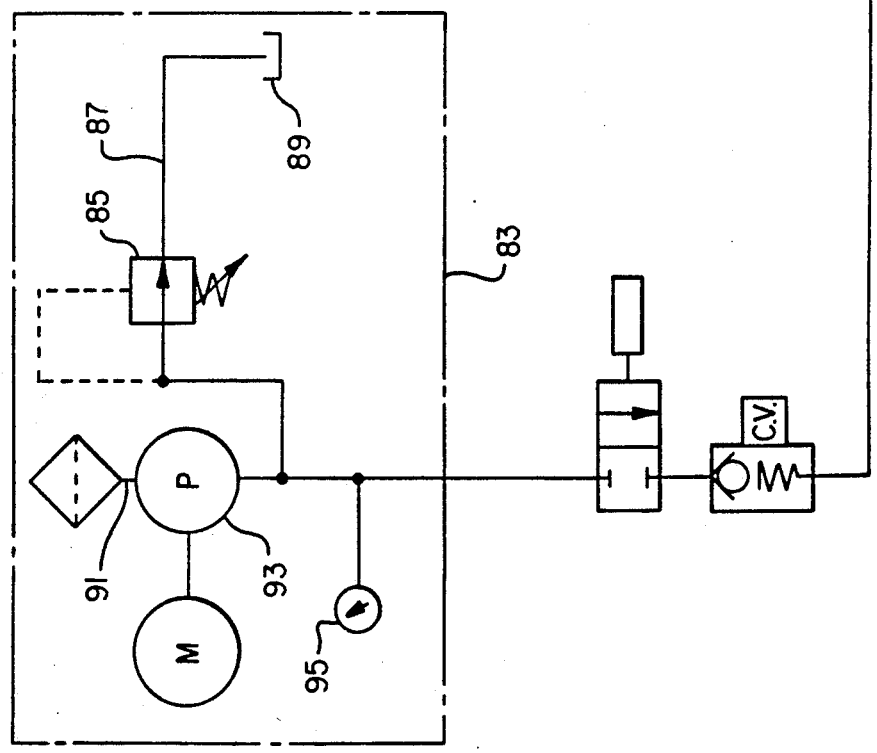
Figure 10:
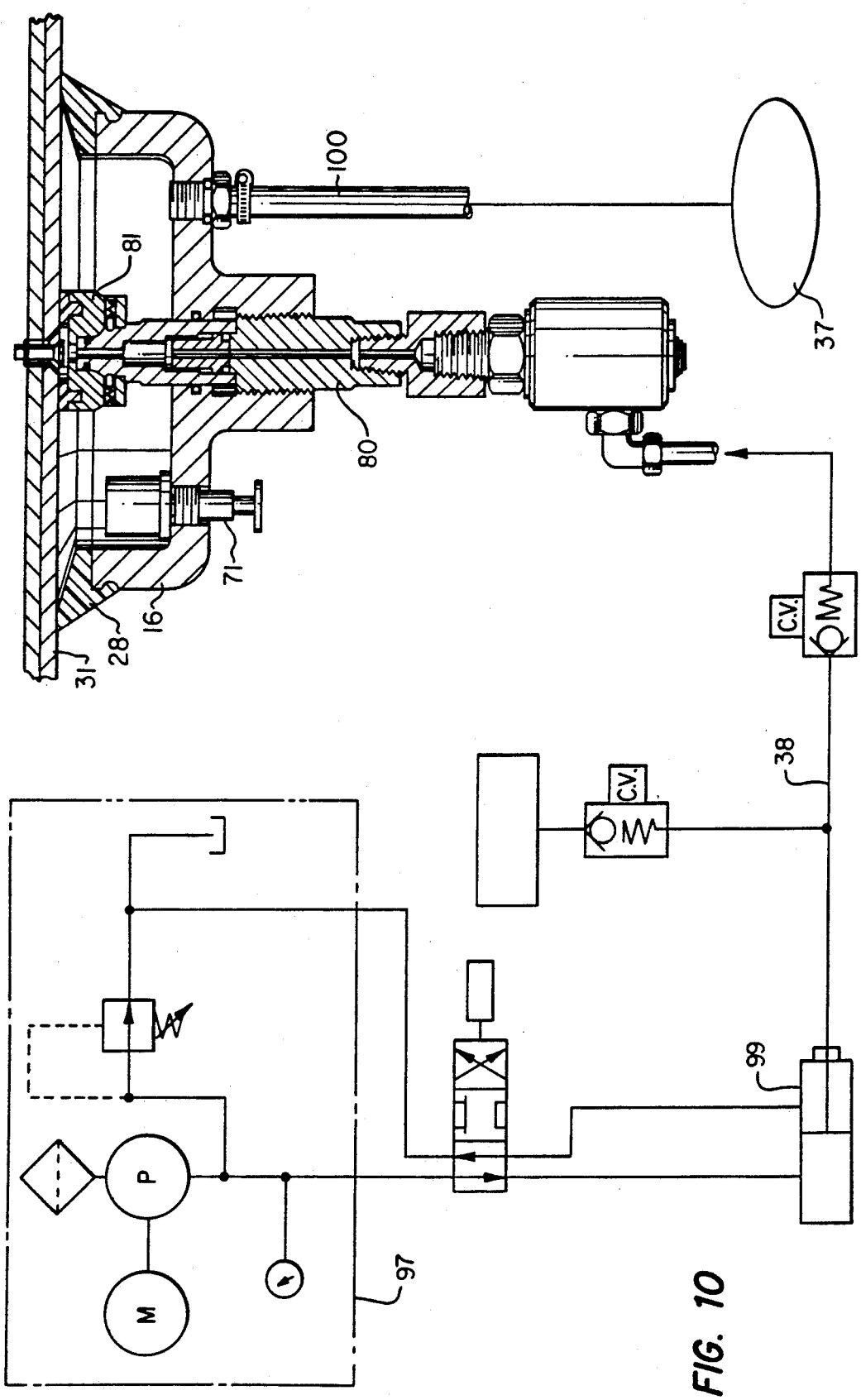
FIG. 10 is a schematic view illustrating an alternate hydraulic circuit for a static pressure injection system.

In areas where there is no flat surface for a vacuum cup to seal against; for example, a curved surface of the aircraft inlet duct, a mechanical hold down system such as illustrated in FIG. 7 may be employed. Therein the supports 76, 77 and 78, are positioned to react against the surface of the inlet 79. The adjusting means allows adjusting the injector to obtain the desired performance. The injection is carried out as described hereinbefore.

Where fasteners of different sizes and configurations are to be injected a second system, as illustrated in FIGS. 8, 9, 10 employing a quick disconnect on the injector head 81 has been developed. This quick disconnect allows rapid change out of injector configurations or gasket types to fit multiple fastener requirements.

While the pulsed shock wave injector provides faster, safer, and more reliable injection for most applications both systems allow for static pressure injection in special situations. It is therefore not necessary to resort to prior art to perform static pressure injections. This greatly simplifies static pressure injections and shortens the time required to perform such operations. The quick disconnect type of injector is shown here set up for static operation (FIGS. 8, 9, 10). Referring to FIGS. 8, 9, and 10, the static pressure system consists of an injection tube 80 and an interchangeable injector fitting 81. The injector head or fitting 81 removably couples onto one end of the injection tube 80. Spring biased latch means 104, in the form of balls and detents, are used to secure the fitting 81 onto the tube 80. An O-ring 106 is provided. A pump system 83, FIG. 9, may be employed with the suction side of pump 93 coupled with reservoir, or media tank 89 for drawing in the medium. A pressure relief valve may be employed. The pressure relief valve is shown by the number 85 in FIG. 9. In the illustrated embodiments, the pressure relief valve relieves through line 87 to medium reservoir 89. The medium reservoir 89 is also connected to the suction side of pump 93, as by line 91. A gauge 95 is provided as part of the pump system 83.

Alternatively, a pump system 97, FIG. 10, can be employed with an intensifier 99 to obtain suitably high pressure. In the illustrated embodiment, the injection medium is delivered at a constant pressure through the feed line 38, injector 80 and is forced into the fastener hole. The drawback to the system is that when the injection pressure becomes high enough to successfully inject many fasteners, build up of back pressure causes the injector fitting to be forced away from the surface and must be opposed by the mechanical holding means, or hold down system, as priorly described.

The same relative elements are employed in this system as described hereinbefore with respect to FIG. 2 and given the same number; for example, the wing surface is delineated 31 the vacuum release valve is delineated 71 and the vacuum gasket, 28 and the cup, 16. A vacuum line 100 is employed to obtain the vacuum between the vacuum pump 37 and the interior of the vacuum cup 16.

In order to achieve a successful injection, a suitable injection medium must be selected. This medium must be of low enough viscosity to flow freely through the injection system and penetrate the gap about the fastener, or otherwise penetrate into the imperfections. The selection of the medium depends upon the purpose of the injection. For corrosion inhibiting, a water displacing corrosion inhibitor compound, such as those products sold under the trademark Amlguard and satisfying military specification MIL- C-18054 (AS); can be employed. For fuel sealing a chromated sealant, such as those products sold under the trademark Deft and given the NAI number 1328 may be used. Some candidate injection media contain properties suitable for both corrosion inhibiting and fuel sealing and some medium may also require thinning to obtain the desired viscosity.

In operation, the particular medium is put into the storage tank and the suction side of the pump connected thereto. The desired system can be employed in conjunction with the holding means for holding the injector for injection of the medium. Thereafter, the injection medium is turned on for injecting about the particular injection site, such as the gap around the fastener, corrosion pits or other imperfections.

Though developed for inhibiting corrosion, this device may also be used for repairing fuel leaks around installed fasteners. For this application, a suitable fuel sealant is injected instead of a corrosion inhibitor.

As noted hereinbefore, this invention describes a system by which a substance can be forced into existing gaps between fasteners and/or parts of an assembled structure with the purpose of forming a chemical barrier. This barrier can be employed to inhibit corrosion, prevent further corrosion from taking place or repair fuel leaks.

This system may employ either a pulse type or static pressure type injector coupled with specialized hold down systems. The injector conducts under pressure the injection medium to the desired area in such a way that it penetrates gaps or voids that may exist.

The vacuum cup hold down systems are used to secure the pulse type injectors to a relatively flat and smooth surface and the mechanical system is employed to hold the pressure injection apparatus within the curved surfaces that prohibit the use of a vacuum system. The primary advantages of this system are versatility, portability, degree of automation and higher injection pressures.

Although this invention has been described with a certain degree of particularity, it is understood that the present disclosure is made only by way of example and that combination and arrangement of parts may be resorted to without departing from the spirit and the scope of the invention, reference being had for the latter purpose to the appended claims.

What is claimed is:

1. A barrier injection apparatus for injecting a medium so as to form a barrier about a fitting, said fitting being located at an injection site, said apparatus comprising:
   a. adjustable and releasable holding means for holding the injection apparatus against a force of injection;
   b. injection means for injecting said medium to form a barrier when said apparatus is in place at the injection site, said injection means being coupled to said adjsutable and releasable holding means;
   c. storage means for storing said medium at atmospheric pressure;
   d. pressure inducing means for pressurizing said injection medium; said pressure inducing means being connected with said storage means and adapted to pump said medium under pressure;
   e. said injection means comprising first conduit means extending from the pressure inducing means to the injection site and adapted to convey said medium under pressure to the injection site;
   f. said injection means also comprising second conduit means extending away from the injection site and adapted to remove any unused said medium from the injection site;
   g. adjusting means for moving the injection means at the injection site to a correct distance from said site, said adjusting means coupling said injection means to said adjustable and releasable holding means;
   h. a gasket means sealingly surrounding the injection site for constraining the medium to flow into the site and insulating the medium at the injection site from said adjustable and releasable holding means, said gasket means being coupled to said injection means;
   i. said pressure inducing means comprising a pressure pulse inducing means for inducing pulses of pressure into said medium in said first conduit means at a plurality of pulses per unit of time, said pressure pulse inducing means allowing said medium to be injected under high pressures so as to penetrate around said fitting while minimizing the force of injection acting on said adjustable and releasable holding means so as to maintain said apparatus in place at said injection site.

2. The barrier injection apparatus of claim 1 wherein said adjustable and releasable holding means comprises at least one vacuum and a vacuum release means.

3. The barrier injection apparatus of claim 2 wherein said adjustable and releasable holding means includes a plurality of vacuum holding apparatus.

4. The barrier injection device of claim 1 wherein said releasable and adjustable holding means is a mechanical apparatus for holding the injection apparatus against the force of injection.

5. The barrier injection apparatus of claim 1 wherein said pressure inducing means comprises means for introducing a static pressure to force said medium into said injection site.

6. The barrier injection device of claim 1 wherein said second conduit means simply conveys said medium out of the barrier injection apparatus and wherein a vessel is provided for catching the medium from the barrier injection apparatus.

7. The barrier injection apparatus of claim 1 wherein said gasket means sealingly surrounding the injection site and constraining said medium to flow into the injection site insulates said medium at the injection site from said holding means and said holding means includes a vacuum operative unit and said fluid is constrained from flowing into said vacuum unit.

8. The barrier injection apparatus of claim 7 wherein said gasket is a synthetic rubber gasket.

9. The barrier injection device of claim 1 wherein said barrier injection apparatus employs a quick disconnect head.

10. The barrier injection apparatus of claim 1 wherein said pressure inducing means includes a means for introducing a static pressure to force said medium into said injection site.

11. An injection apparatus for use in injecting a fluid medium into a location at a work site, said apparatus comprising:
 a. injector means for injecting said medium into said work site location, said injector means having an end that is adapted to be located adjacent to said work site, said injector means having a first channel extending away from a first channel opening that is located at said end, said first channel being adapted to convey pressurized medium to said work site, said injector means having a second channel extending away from a second channel opening that is located at said end, said second channel being adapted to convey unused medium away from said work site, said injector means having seal means at said end, said seal means being adapted to contact said work site and provide a seal around said first and second channel openings;
 b. storage means for storing a supply of said medium, said storage means being connected to said first channel;
 c. retaining means for retaining said injector means to said work site while said medium is being injected, said retaining means being coupled to said injector means and being releasable such that said injector means can be removed from said work site, said injection of said medium into said work site producing a force of injection, said retaining means being capable of withstanding said injection force;
 d. pressurizing means for pressurizing said medium in said first channel to an injection pressure such that said medium in said first channel is injected into said work site location, said pressurizing means being connected to said first channel, said pressurizing means providing pulsed pressurization of said medium in said first channel, wherein high pulsed pressures can be utilized in injecting said medium in said first channel while minimizing said injection force acting on said retaining means.

12. The injection apparatus of claim 11 wherein said retaining means comprises vacuum cup means, said vacuum cup means having a wall that forms a cavity, which cavity is located adjacent to said work site, said wall having an opening therethrough to which is attached vacuum means for creating a vacuum inside of said cavity, said wall having a second opening which receives said injector means.

13. The injection apparatus of claim 12 wherein said pressurizing means pressurizes said medium in said pulses up to 2000 psi at a rate up to 20 pulses per second.

14. The injection apparatus of claim 11 wherein said injection apparatus is adapted to be used where a bearing surface is located opposite of said work site, said retaining means comprising support means that couples to said injector means and that extends from said injector means at said work site to said bearing surface, said support means reacting against said bearing surface when said medium is injected under pressure.

15. The injection apparatus of claim 11 wherein said injection apparatus is adapted to be used in an aircraft inlet duct, said work site being on an interior surface of said duct, said retaining means comprising plural support means that are adapted to bear on duct surfaces located away from said work site, said support means being coupled together and bearing on said duct surfaces that are located away from said work site, said injector means being coupled to one of said support means such that the force of injection acts upon said support means bearing on said duct surfaces.

16. The injection apparatus of claim 11 wherein said injector means comprises an injector head coupled to an injector body, said injector body comprising said first and second channels, said injector head comprising said injector means end, said injector head having first and second channels corresponding to and communicating with said first and second channels of said injector body, said injector head having plural first channel openings that surround said second channel opening.

17. The injection apparatus of claim 11 wherein said pressurizing means pressurizes said medium in pulses up to 2000 psi at a rate between 10 and 20 pulses per second.

18. An injection apparatus for use in injecting a fluid medium into a location at a work site, said apparatus comprising:
 a. injector means for injecting said medium into said work site location, said injector means comprising an injector body and an injector head, said injector head being coupled to said injector body;
 b. said injector means having a first channel that extends from a first channel opening on said injector head and through said injector head and said injector body, said first channel being adapted to convey pressurized medium to said work site;
 c. said injector means having a second channel that extends from a second channel opening on said injector head and through said injector head and said injector body, said second channel being adapted to convey unused medium away from said work site;
 d. seal means for providing a seal around said first and second channel openings, said seal means being coupled to said injector head and being adapted to contact said work site;
 e. retaining means for retaining said injector means to said work site while said medium is being injected;
 f. adjusting means for adjusting the position of said injector head relative to said retaining means, said adjusting means comprising a first member coupled to said retaining means and a second member coupled to said injector means such that said second member rotates relative to said injector means, said first and second members rotatingly coupled to each other such that when said second member is rotated relative to said first member the position of said injector head is adjusted without rotation of said injector head and said seal means when said seal means engages said work site;

g. storage means for storing a supply of said medium, said storage means being connected to said channel;
h. pressurizing means for pressurizing said medium in said first channel to injection pressures such that said medium in said first channel is injected into said work site location, said pressurizing means being connected to said first channel.

19. The injection apparatus of claim 18 wherein said injector head has plural first channel openings surrounding said second channel opening, said first channel in said injector head being annular and surrounding said second channel in said injector head such that said annular injector head first channel allows said injector head to rotate relative to said injector body.

20. The injection apparatus of claim 18 wherein said injector head is coupled to said injector body with a releasable latch, wherein said injector head can be easily removed from said injector body so as to allow substitution of an additional injector head onto said injector body.

21. An injection apparatus for use in injecting a fluid medium into a location at a work site, said apparatus comprising:
 a. injector means for injecting said medium into said work site location, said injector means comprising an injector body and an injector head, said injector head being coupled to said injector body;
 b. said injector means having a first channel that extends from a first channel opening on said injector head and through said injector head and said injector body, said first channel being adapted to convey pressurized medium to said work site;
 c. said injector means having a second channel that extends from a second channel opening on said injector head and through said injector head and said injector body, said second channel being adapted to convey unused medium away from said work site;
 d. seal means for providing a seal around said first and second channel openings, said seal means being coupled to said injector head and being adapted to contact said work site;
 e. retaining means for retaining said injector means to said work site while said medium is being injected;
 f. adjusting means for adjusting the position of said injector head relative to said retaining means, said adjusting means comprising a first member coupled to said retaining means and a second member coupled to said injector means such that said second member rotates relative to said injector means, said first and second members rotatingly coupled to each other such that when said second member is rotated relative to said first member the position of said injector head is adjusted without rotation of said injector head and said seal means when said seal means engages said work site;
 g. storage means for storing a supply of said medium, said storage means being connected to said channel;
 h. pressurizing means for pressurizing said medium in said first channel to injection pressures such that said medium in said first channel is injected into said work site location, said pressurizing means being connected to said first channel, said pressurizing means providing pulsed pressurization of said medium in said first channel, wherein high pulsed pressures can be utilized in injecting said medium in said first channel while minimizing said injection force acting on said retaining means.

* * * * *